Nov. 5, 1940.                    C. E. HOLMES                    2,220,817
                    CONTAINER FOR FISHING TACKLE AND THE LIKE
                    Filed April 6, 1939          2 Sheets-Sheet 1
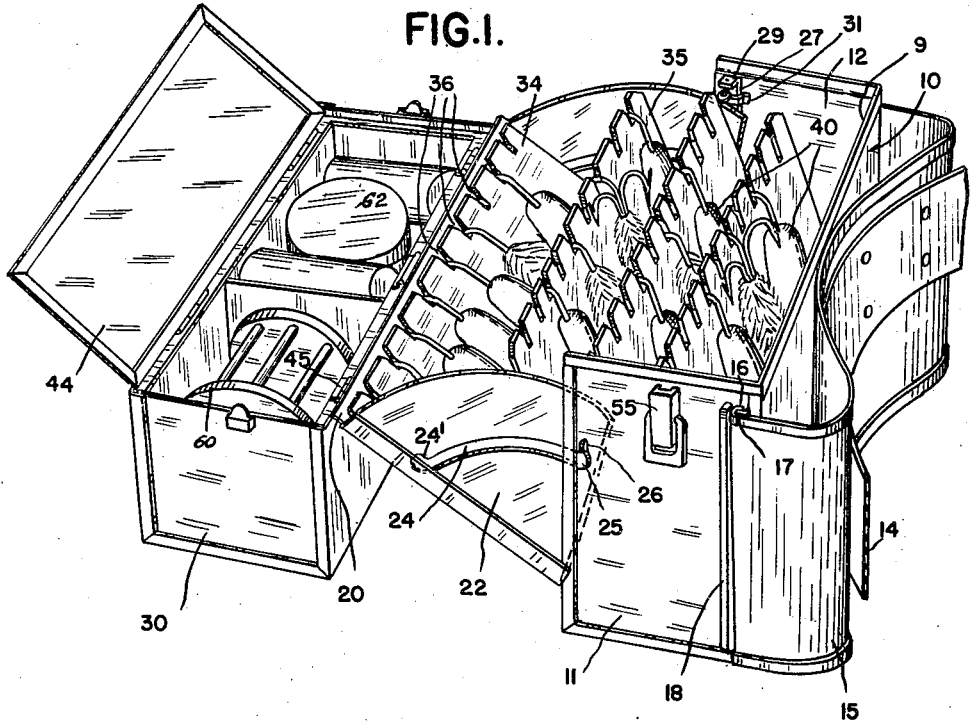
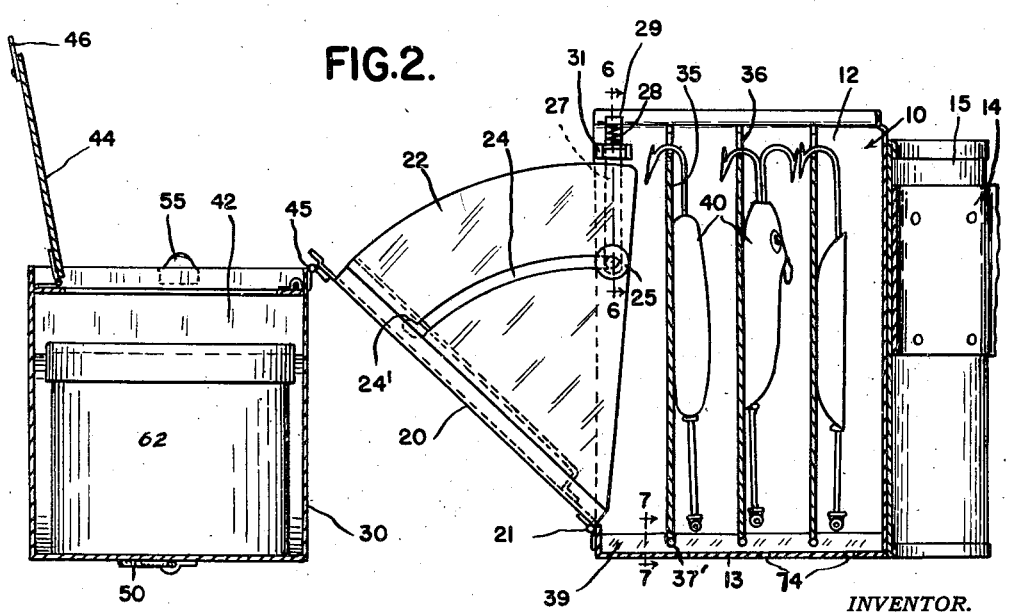
INVENTOR.
CLYDE E. HOLMES
BY
ATTORNEYS Nov. 5, 1940.  C. E. HOLMES  2,220,817

CONTAINER FOR FISHING TACKLE AND THE LIKE

Filed April 6, 1939  2 Sheets-Sheet 2

INVENTOR.
CLYDE E. HOLMES
BY
ATTORNEYS

Patented Nov. 5, 1940

2,220,817

UNITED STATES PATENT OFFICE 2,220,817

CONTAINER FOR FISHING TACKLE AND THE LIKE

Clyde E. Holmes, Boyne City, Mich.

Application April 6, 1939, Serial No. 266,339

15 Claims. (Cl. 43—31)

This invention relates to containers, and particularly to improvements in the construction of boxes for tackle and the like.

Boxes adapted to hold a variety of fishing tackle, such as bait, reels, and the like, and intended to enable convenient use of the contents by a fisherman, present a number of problems peculiar to containers of this class and which have not been solved by tackle boxes as previously constructed. Not only should such a box accommodate as much tackle as possible in a small space, but the bait should be so arranged in the box as to be readily accessible at all times. Hooked lures should be prevented from tangling. The box should be relatively narrow when closed, to enable the fisherman to carry it conveniently, yet it should be stable and difficult to upset when open. It should not be possible to spill the contents by lifting the box by its handle while unlocked, and the entire contents should be easily accessible not only while the box is rested upon a support, but while it is being carried. It is believed that the outlined characteristics have never before been incorporated in a tackle box in a manner equivalent to their incorporation in my improved box herein disclosed, and the foregoing statement of desiderata constitutes a summary of the principal objects of this invention.

A further object of the invention is to provide an improved tackle box adapted to be strapped to the body, by means of a belt or the like, and shaped to be very conveniently carried in this manner, yet which may be fully opened while so strapped to the body, to afford convenient access to the entire contents, and the parts of which are so proportioned and interconnected as to maintain the container parts in upright position and effectively prevent spilling of the contents.

Another object of this invention is to provide such a container which, when opened, presents a greatly widened base, rendering it difficult to upset when open, even though it be placed upon an uneven or insecure support, or rocked quite violently, as, for example, in a small boat.

Still another object is to provide an improved container for fishing tackle and the like wherein hooked fish lures are adapted to be supported in spaced, individual relation upon panels swingable in the box and generally upright in their arrangement, the panels being individually removable, together with the bait carried thereby, and the arrangement being such that water may easily drain from the bait and from the box, to prevent rusting.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of my improved tackle box fully opened, illustrating a typical arrangement of fishing tackle therein.

Figure 2 is a vertical cross section of the open box.

Figures 6, 7:
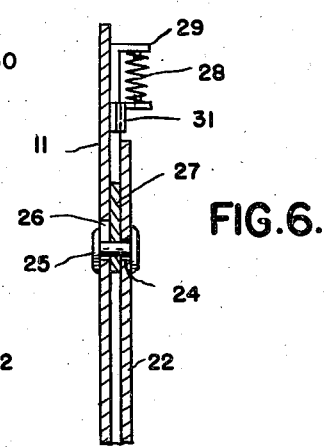

Figures 6 and 7 are vertical sectional details taken substantially on the lines 6—6 and 7—7 respectively of Figure 2, and looking in the direction of the arrows.

Figure 3:
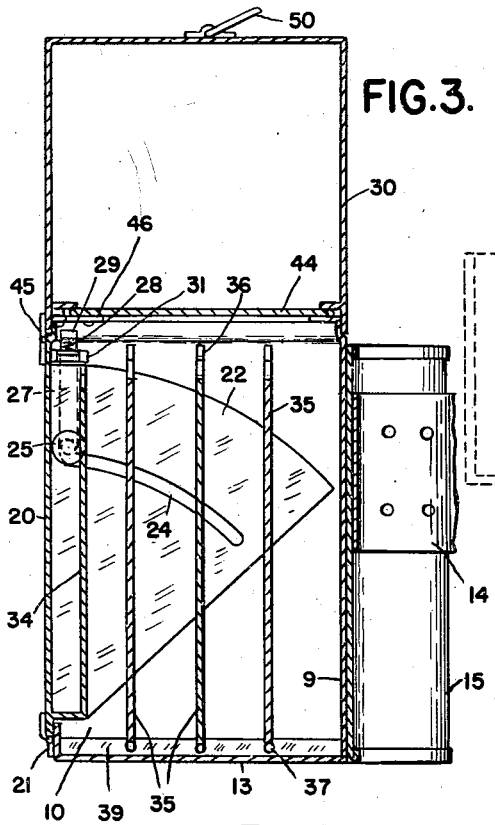
Figure 3 is a similar vertical section of the box closed and empty.
Figure 4:
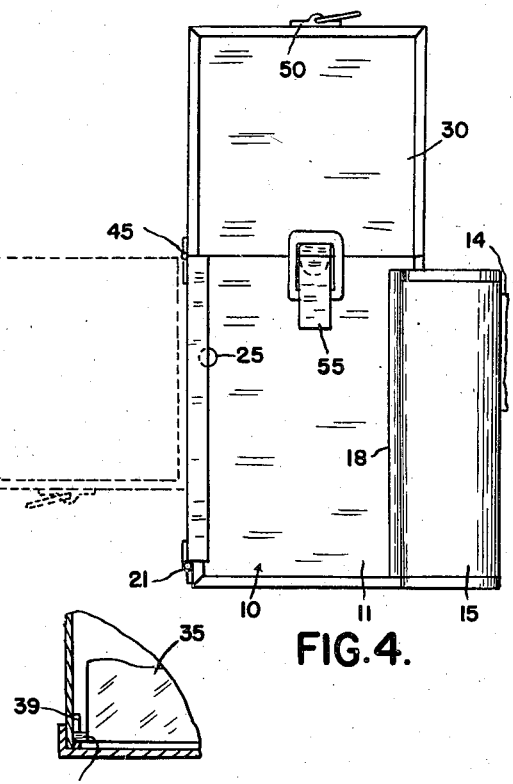
Figure 4 is an end elevational view of the box closed, indicating in dotted lines the open position of the lid.
Figure 5:
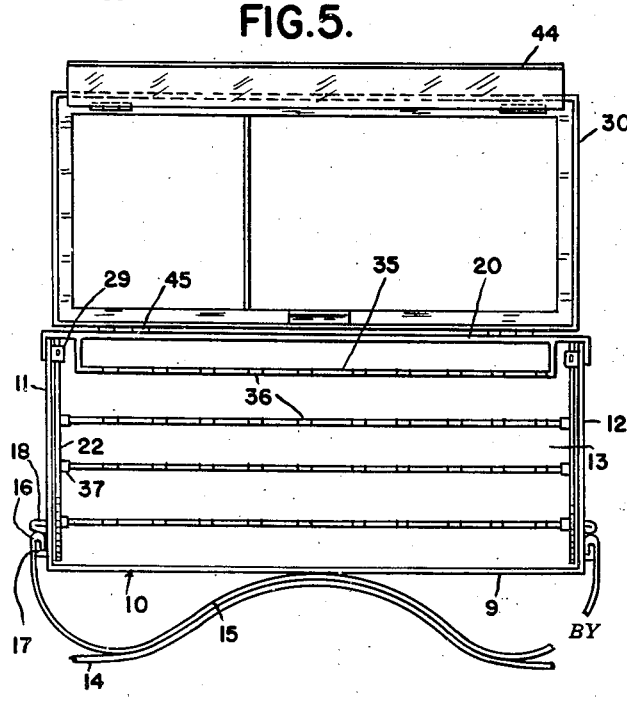
Figure 5 is a plan view of the box with the lid open and the bait cabinet section closed.

Referring now to the drawings: It will be seen that my improved box is provided with three fixed walls, a fixed bottom, and one outwardly swingable wall which facilitates access to the interior to the main or bait compartment 10. The fixed longitudinal wall 9 will be referred to as the inside wall, since normally, when the box is used, such wall is closest to the body of the user. Attached to wall 9 are fixed end walls 11, 12 and a fixed bottom 13, which may be perforated as at 14 to allow water to drain therefrom. Belt loops 14 are attached to the inner surface of a form-fitting panel 15, adapted to be removably positioned over the wall 9. The panel 15 is provided at its end with inturned hooked edges 16 (Fig. 5) slidable in suitable retaining channels 17 formed at the ends of the box by integral extensions of the rear wall 9, which extensions overlap and are secured to the end walls. The end walls may be provided with integral ribs 18 parallel to and slightly spaced from the retaining channels 17, and adapted to protect the same against deformation as well as prevent escape of the hooked portions 16, except by sliding the panel 17 vertically from the box.

The outer wall 20 is hinged to the box along a longitudinal line near the bottom, the hinge being designated 21. Sector-shaped swinging gusset plates 22 are attached to the hinged wall 20 and provided with arcuate slots 24, concentric with the hinge axis and limiting the extent of opening of the hinged wall. Loose rivets 25 extend through the slots 24 and through the end walls of the box, acting as stops. Rivets 25 are vertically slidable in slots 26 in the end walls, the rivets being movable downwardly by means of plungers 27 connected thereto, and normally urged upwardly by spring means 28 reacting against the overbent finger portion 29 formed at the upper end of each plunger and located in convenient positions near the top of the box, on the inside thereof, so as to be readily accessible when the lid 30 is open. Each plunger is guided by a bracket 31 attached to the inside of the box and also serving as an abutment for the lower end of the spring 28. A vertical extension 24' is formed at the outer end of each of the slots 24, in such position as to allow the rivets 25 to be moved upwardly thereinto under the influence of the springs 28 when the wall 20 is closed, the rivets thus acting as latching means to hold the wall against opening, until the rivets are moved downwardly by depressing the plungers.

Attached to the inner surface of the swingable wall 20 is a bait-supporting panel 34, provided along its top with spaced notches 36, while within the box and pivotally supported at the bottom thereof are additional swingable panels 35, similarly notched at spaced intervals along their tops. It will be apparent that artificial baits as 40 are adapted to be supported by the bait panels in inverted position, simply by placing their hooks in the notches, the spacing between the panels and the notches being sufficient to accommodate the lures without interference or undue crowding, and the hooks being kept apart by this method of support. Preferably, enough of the notches 36 are provided to enable the user to space the baits as desired.

The panels 35 are provided at their bottom edges with lateral supporting ears 37, serving as pivots and adapted to project into slots 37' formed in retaining strips 39 extending along the end walls of the box at the bottom thereof. The slots are open at their tops, to permit the bait panels to be removed and reinserted at will.

The lid portion 30 is formed as a separate receptacle, and is hinged at 45 along the upper edge of the swingable wall 20, in such manner that when wall 20 is closed, it may be inverted over the bait compartment to form a closure for the box. The upper edges of walls 9, 11, 12 may be inset sufficiently to be embraced by the lower edge of the closed lid. When the cover portion is open, the space within it is accessible by opening the separate lid 44, hinged along its edge farthest from the line of attachment to the wall 20 and provided with separate fastening means as 46. To the outside of the lid portion which constitutes the top when the box is closed, a handle 50 is pivoted, and fasteners 55 are provided on the end walls of the box and lid section, serving to fasten the lid in closed position and thereby to lock all of the parts together. Any desired fishing or other equipment may be packed in the receptacle provided by the lid section, such for example as the reel indicated at 60, and the containers for bait or the like indicated at 62.

It will be seen that the depth of the cover with relation to the height of the swinging wall and the extent of opening movement of the latter is such that when the parts are opened the bottom of the box and the inverted cover section provide a greatly increased supporting base adapted to rest upon the surface upon which the box is placed, the proportions of the box when so opened being such that it is very difficult to upset. When the box is carried in the open condition, as by being fastened to the body by means of a belt passed through the loops 14, the lid section hangs with its inner cover 44 uppermost.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A container of the character described, comprising a body portion formed of upright walls, means hingedly connecting the lower edge of one wall to the container along a longitudinal line, and a lid portion pivotally attached to the free edge of said hinged wall and adapted to be moved to and from a position in which it overlies the container to form a closure therefor.

2. Means as set forth in claim 1, including means for limiting the outward swinging movement of said hinged wall, said limiting means, hinged wall and lid portion being so proportioned that when the hinged wall is swung outwardly, the open lid portion and the bottom of the container may form an extended base adapted to rest upon a supporting surface.

3. A tackle box of relatively long narrow form, having a body portion formed of upright walls, including a longitudinal wall and means hingedly connecting said longitudinal wall to the body portion along a line near the bottom thereof, said wall being swingable bodily outwardly away from the interior of the container, and tackle-supporting means comprising panel members arranged vertically within said container and swingable about their bottom edges when said wall is in outswung position.

4. Means as set forth in claim 3, including pivot means for said panels within and near the bottom of the body, said pivot means being free at the top to permit insertion and removal of said panels from above.

5. Means as set forth in claim 3, including notched bait-supporting means carried by said swingable wall near the top thereof, said panels being provided at spaced intervals along their upper edges with open-topped bait-supporting notches.

6. A container for fishing tackle and the like, comprising a relatively long and narrow box, having a fixed longitudinal side wall, means for supporting the box upon the body of a user, with said fixed wall next to the body, an outer longitudinal wall pivoted to the box along a longitudinal line near the bottom thereof and swingable bodily outwardly away from the interior, a cover for the container hinged to the free edge of said swingable wall, and bait-supporting means within the container including panels arranged substantially parallel to said walls and swingable in and near the bottom of the container.

7. Means as set forth in claim 6 in which said cover portion is of hollow construction and forms an independent container, the interior of which is accessible when the cover is open, and means limiting the opening movement of said swingable wall, said limiting means, the cover and the swingable wall being so proportioned that the cover may depend with its open side uppermost from said swingable wall, to afford access to the interior of the cover, or may rest upon a surface substantially coplanar with the bottom of the container when the swingable wall is in the outswung position.

8. Means as set forth in claim 6 in which said cover is hollow and forms a separate container, separate closure means for the hollow cover hinged to the side of said cover opposite that which is attached to the swingable wall.

9. Means as set forth in claim 6 including separate latching means for holding said swingable wall against outward movement and for securing said cover in closed position.

10. A container construction for fish lures and the like, comprising a box-like casing, a panel element disposed substantially vertically therein and swingable about its bottom edge, and a plurality of spaced, hook-receiving portions carried by and substantially at the top of said panel.

11. Means as set forth in claim 10 including a wall forming a part of said casing swingable outwardly away from the remainder of the casing about an axis parallel and close to the axis of swinging movement of said panel, and bait-supporting portions carried by the interior of said wall near the top thereof.

12. Means as set forth in claim 10 including a wall of said casing disposed substantially parallel to said panel, means pivotally connecting said wall at its bottom edge to the remainder of said casing, and a cover portion for the container carried by said wall.

13. A container for fish lures and the like, comprising a box-like casing having an opening in the bottom through which water may drain, hook-receiving means within and near the top of said casing from which lures may be suspended in inverted position, and panel elements arranged substantially upright and adapted to project between lures to prevent unwanted engagement therebetween without preventing escape of water from the casing through such opening.

14. A container for fish lures and the like, comprising a box-like casing having upright walls, means pivotally connecting one of said walls to the remainder of said casing for swinging movement about a longitudinal axis near the bottom thereof, a hollow cover portion forming a separate receptacle pivoted to the free edge of the swingable wall and adapted to be inverted over the remainder of the casing to form a closure therefor when the swingable wall is swung to innermost position, and separate locking means for holding said cover portion against swinging with relation to the casing, and for holding said swingable wall against swinging movement.

15. Means as set forth in claim 14 including separate closure means for said hollow cover portion hinged to the top thereof on its side opposite that attached to said swingable wall.

CLYDE E. HOLMES.